(12) United States Patent
Smit

(10) Patent No.: US 11,333,810 B2
(45) Date of Patent: May 17, 2022

(54) SYSTEM OF NETWORKED CONTROLLERS, AND METHOD OF OPERATING A SYSTEM OF NETWORKED CONTROLLERS

(71) Applicant: Solutia Canada Inc., St. Louis, MO (US)

(72) Inventor: Matthew P. Smit, Burnaby (CA)

(73) Assignee: Solutia Canada Inc., British Columbia (CA)

( * ) Notice: Subject to any disclaimer, the term of this patent is extended or adjusted under 35 U.S.C. 154(b) by 410 days.

(21) Appl. No.: 16/111,458

(22) Filed: Aug. 24, 2018

(65) Prior Publication Data

US 2019/0064408 A1 Feb. 28, 2019

Related U.S. Application Data

(60) Provisional application No. 62/550,351, filed on Aug. 25, 2017.

(51) Int. Cl.
| | |
|---|---|
| *G02B 5/23* | (2006.01) |
| *G02B 5/28* | (2006.01) |
| *G02B 5/20* | (2006.01) |
| *G02B 6/293* | (2006.01) |

(52) U.S. Cl.
CPC ............ *G02B 5/23* (2013.01); *G02B 5/201* (2013.01); *G02B 5/282* (2013.01); *G02B 6/29395* (2013.01)

(58) Field of Classification Search
CPC .......... G02B 5/23; G02B 5/201; G02B 5/282; G02B 5/20; G02B 6/29395; G02B 6/293
USPC ....................................................... 359/241
See application file for complete search history.

(56) References Cited

U.S. PATENT DOCUMENTS

| | | | |
|---|---|---|---|
| 5,355,245 | A | 10/1994 | Lynam |
| 5,463,491 | A | 10/1995 | Check, III |
| 5,604,626 | A | 2/1997 | Teowee et al. |
| 5,822,107 | A | 10/1998 | Lefrou et al. |
| 5,838,483 | A | 11/1998 | Teowee et al. |

(Continued)

FOREIGN PATENT DOCUMENTS

| | | |
|---|---|---|
| CA | 2860069 | 12/2017 |
| CA | 2860069 C | 12/2017 |

(Continued)

OTHER PUBLICATIONS

Co-pending U.S. Appl. No. 14/395,381, filed Apr. 18, 2013, Branda et al. Now U.S. Pat. No. 9,594,285.

(Continued)

*Primary Examiner* — William R Alexander
(74) *Attorney, Agent, or Firm* — Michael K. Carrier

(57) ABSTRACT

A system of networked controllers includes one or more switchable optical filters, and the switchable optical filters are photochromic and electrochromic. The system also includes a master controller, and one or more slave controllers operably connected to the one or more switchable optical filters. At least one of the one or more slave controllers is communicatively coupled to the master controller. The master controller is configured to transmit a switching command to the at least one of the one or more slave controllers. Each slave controller is operable, in response to receiving the switching command, to cause a corresponding switchable optical filter to transition from a first state to a second state.

16 Claims, 4 Drawing Sheets

(56) References Cited

U.S. PATENT DOCUMENTS

| | | | |
|---|---|---|---|
| 6,055,089 | A | 4/2000 | Schulz et al. |
| 6,065,836 | A | 5/2000 | Krishnan et al. |
| 6,084,700 | A | 7/2000 | Knapp et al. |
| 6,084,702 | A | 7/2000 | Byker et al. |
| 6,246,505 | B1 | 6/2001 | Teowee et al. |
| 6,449,082 | B1 | 9/2002 | Agrawal et al. |
| 6,547,404 | B2 | 4/2003 | Schierbeek |
| 6,897,997 | B2 | 5/2005 | Malvino |
| 6,910,729 | B2 | 6/2005 | Kraenzler et al. |
| 6,934,067 | B2 | 8/2005 | Ash et al. |
| 7,133,181 | B2 | 11/2006 | Greer |
| 7,277,215 | B2 | 10/2007 | Greer |
| 7,300,167 | B2 | 11/2007 | Fernando et al. |
| 7,459,189 | B2 | 12/2008 | Tahara et al. |
| 7,800,812 | B2 | 9/2010 | Moskowitz |
| 7,990,603 | B2 | 8/2011 | Ash et al. |
| 8,096,421 | B2 | 1/2012 | Shinoda |
| 8,098,421 | B2 | 1/2012 | Moskowitz |
| 8,102,586 | B2 | 1/2012 | Albahri |
| 8,120,839 | B2 | 2/2012 | Moskowitz |
| 8,213,074 | B1 | 7/2012 | Shrivastava et al. |
| 8,254,013 | B2 | 8/2012 | Mehtani et al. |
| 8,441,707 | B2 | 5/2013 | Lam et al. |
| 8,792,154 | B2 | 7/2014 | Moskowitz |
| 8,879,140 | B2 | 11/2014 | Nagel et al. |
| 9,261,752 | B2 | 2/2016 | Moskowitz |
| 9,568,799 | B2 | 2/2017 | Lam et al. |
| 9,594,285 | B2 | 3/2017 | Branda et al. |
| 9,658,509 | B2 | 5/2017 | Moskowitz |
| 10,185,199 | B2 | 1/2019 | Branda et al. |
| 10,539,812 | B2 | 1/2020 | Smit et al. |
| 2003/0210449 | A1 | 11/2003 | Ingalls et al. |
| 2004/0001056 | A1 | 1/2004 | Atherton et al. |
| 2005/0046920 | A1 | 3/2005 | Freeman et al. |
| 2005/0254114 | A1* | 11/2005 | Shinohara .............. H04N 5/238 359/265 |
| 2006/0209007 | A1 | 9/2006 | Pyo et al. |
| 2006/0245024 | A1 | 11/2006 | Greer |
| 2007/0220427 | A1 | 9/2007 | Briancon et al. |
| 2008/0239452 | A1 | 10/2008 | Xu et al. |
| 2009/0002802 | A1 | 1/2009 | Shibuya et al. |
| 2009/0213282 | A1 | 8/2009 | Burlingame et al. |
| 2010/0283957 | A1 | 11/2010 | Matera et al. |
| 2010/0315693 | A1 | 12/2010 | Lam et al. |
| 2011/0148218 | A1 | 6/2011 | Rozbicki |
| 2012/0044560 | A9* | 2/2012 | Lam .......................... B60J 3/04 359/241 |
| 2012/0239209 | A1 | 9/2012 | Brown et al. |
| 2013/0161971 | A1 | 6/2013 | Bugno et al. |
| 2014/0211317 | A1 | 7/2014 | Thiel et al. |
| 2014/0292206 | A1* | 10/2014 | Lashina ................. H05B 47/10 315/149 |
| 2014/0354940 | A1 | 12/2014 | Lam et al. |
| 2015/0116808 | A1 | 4/2015 | Branda et al. |
| 2017/0075323 | A1* | 3/2017 | Shrivastava ........... G06Q 10/06 |
| 2019/0064408 | A1 | 2/2019 | Smit |
| 2020/0207187 | A1 | 7/2020 | Smit et al. |

FOREIGN PATENT DOCUMENTS

| | | | |
|---|---|---|---|
| CN | 101131799 | A | 2/2008 |
| CN | 101142520 | A | 3/2008 |
| EP | 2161615 | B1 | 12/2013 |
| JP | S57167009 | A | 10/1982 |
| JP | H08160471 | A | 6/1996 |
| WO | 2004/015024 | A1 | 2/2004 |
| WO | 2009/108753 | A1 | 9/2009 |
| WO | 2010/142019 | A1 | 12/2010 |
| WO | 2012/079160 | A1 | 6/2012 |
| WO | 2012/125332 | A3 | 9/2012 |
| WO | 2013/155612 | A1 | 10/2013 |
| WO | WO 2014/025690 | A1 | 2/2014 |
| WO | 2017/153403 | A1 | 9/2017 |

OTHER PUBLICATIONS

Co-pending U.S. Appl. No. 16/641,179, filed Aug. 24, 2018.
International Search Report and Written Opinion from International Application No. PCT/CA2013/000381 dated Aug. 1, 2013.
Extended European Search Report dated Dec. 22, 2015 for European Application No. EP13778526.7.
USPTO Office Action dated Feb. 25, 2016 in co-pending U.S. Appl. No. 14/395,381.
Co-pending U.S. Appl. No. 15/570,888, filed Apr. 29, 2016, Smit et al. Now U.S. Pat. No. 10,539,812.
International Search Report and Written Opinion from International Application No. PCT/CA2016/050503 dated May 26, 2016.
USPTO Notice of Allowance dated Oct. 27, 2016 in co-pending U.S. Appl. No. 14/395,381.
Co-pending U.S. Appl. No. 15/416,965, filed Jan. 26, 2017, Branda et al. Now U.S. Pat. No. 10,185,199.
USPTO Office Action dated Oct. 10, 2017 in co-pending U.S. Appl. No. 15/416,965.
USPTO Office Action dated Apr. 9, 2018 in co-pending U.S. Appl. No. 15/416,965.
Extended European Search Report dated May 9, 2018 for European Application No. 17204963.7.
International Search Report and Written Opinion from International Application No. PCT/CA2018/050227 dated May 11, 2018.
Co-pending U.S. Appl. No. 16/490,215, filed Feb. 27, 2018, now U.S. Patent Publication No. 2020-0207187.
Co-pending U.S. Appl. No. 16/111,458, filed Aug. 24, 2018, now U.S. Patent Publication No. 2019-0064408.
USPTO Notice of Allowance dated Sep. 14, 2018 in co-pending U.S. Appl. No. 15/416,965.
International Search Report and Written Opinion from International Application No. PCT/CA2018/051026 dated Nov. 28, 2018.
USPTO Office Action dated Apr. 29, 2019 in co-pending U.S. Appl. No. 15/570,888.
USPTO Notice of Allowance dated Sep. 5, 2019 in co-pending U.S. Appl. No. 15/570,888.
Extended European Search Report dated Feb. 5, 2020 for European Application No. 19188714.0.
Extended European Search Report dated Nov. 16, 2020 for European Application No. 18761046.4.
USPTO Office Action dated Jan. 11, 2021 in co-pending U.S. Appl. No. 16/111,458.
USPTO Notice of Allowance dated Apr. 23, 2020 in co-pending U.S. Appl. No. 16/111,458.
International Search Report and Written Opinion for International Application No. PCT/CA2010/000849, dated Oct. 27, 2010.
International Preliminary Report on Patentability for International Application No. PCT/CA2010/000849 dated Dec. 12, 2011.
Gorodetsky, "The design of dual-mode photochromic and electrochromic 1,2-dithienylcyclopentene dyes", PhD dissertation, Simon Fraser University (Canada), 2008, Chapters 1 & 5, Section 4.4.
Skigeartv, "Sneak Peek 2015 Uvex Snowstrike Variotronic Ski and Snowboarding Goggle Review," YouTube, Published Feb. 25, 2014, retrieved May 20, 2021, URL=https://youtube.com/watch?v=1dd1lNDC24ps (screenshot only).
Uvex Sports, "4 is more—Variotronic technology," YouTube, Published Oct. 29, 2014, retrieved on May 20, 2021, URL=https://www.youtube.com/watch?v=8cC-IBtMxmk (screenshot only).
Zhang et al., "An UV photochromic memory effect in proton-based WO3 electrochromic devices", Applied Physics Letters, vol. 93, No. 20, 2008, 203508-1-203508-2.

\* cited by examiner

① GPS receiver
② Light sensor of interior+outside light sensor
③ RF receiver (WiFi, Zigbee, Bluetooth)
④ Clock (quartz oscillator)
⑤ Gyroscope

SYSTEM OF NETWORKED CONTROLLERS, AND METHOD OF OPERATING A SYSTEM OF NETWORKED CONTROLLERS

CROSS-REFERENCE TO RELATED APPLICATION

This application claims the benefit of the filing date of U.S. provisional patent application Ser. No. 62/550,351, filed Aug. 25, 2017, the disclosure of which is incorporated herein by reference in its entirety.

FIELD OF THE DISCLOSURE

The present disclosure relates to systems of networked controllers as used in connection with switchable optical filters, and methods of operating systems of networked controllers.

BACKGROUND TO THE DISCLOSURE

Variable transmittance optical filters (or "switchable optical filters") can be incorporated into a window to manufacture a variable transmittance window that permits the electromagnetic radiation that is transmitted through the window to be selectively filtered. For example, when incorporated into a vehicle, such as the vehicle's sunroof or passenger windows, one or both of the intensity and frequency of the electromagnetic radiation that enters and exits the vehicle via variable transmittance windows can be controlled to influence parameters such as the intensity of light within the vehicle.

Various controllers can be used to adjust the transmittance of switchable optical filters, and are typically responsive to user input. The present disclosure seeks to provide improved systems of networked controllers, for controlling switchable optical filters.

SUMMARY OF THE DISCLOSURE

In a first aspect of the disclosure, there is provided a system of networked controllers. The system comprises one or more switchable optical filters. The switchable optical filters are photochromic and electrochromic. The system further comprises a master controller. The system further comprises one or more slave controllers operably connected to the one or more switchable optical filters. At least one of the one or more slave controllers is communicatively coupled to the master controller. The master controller is configured to transmit a switching command to the at least one of the one or more slave controllers. Each slave controller is operable, in response to receiving the switching command, to cause a corresponding switchable optical filter to transition from a first state to a second state.

The first state may comprise a first colour and the second state comprises a second colour.

The first state may comprise a first amount of light transmittance and the second state comprises a second amount of light transmittance.

The switchable optical filters may be configured to transition from a first state of relatively lower light transmittance to a second state of relatively higher light transmittance in response to application of a potential difference across the switchable optical filters.

The switchable optical filters may be configured to transition from a first state of relatively higher light transmittance to a second state of relatively lower light transmittance in response to light incident on the switchable optical filters.

The switching command may comprise an indication of a subset of the one or more slave controllers. The master controller may be further configured to transmit the switching command to each slave controller of the subset of the one or more slave controllers.

The one or more slave controllers may be associated with one or more geographic zones. The indication may comprise at least one of the geographic zones. The master controller may be further configured to transmit the switching command to each slave controller associated with the at least one of the geographic zones.

Each slave controller may be further operable, in response to detecting a further switching command, to cease the corresponding switchable optical filter from transitioning from the first state to the second state.

Each slave controller may comprise a user interface operable to receive user input. Each slave controller may be further operable to detect the further switching command in response to a user input received at the user interface.

The system may further comprise a GPS receiver operable to generate a GPS signal and being communicatively coupled to the master controller and/or at least one of the one or more slave controllers. The master controller may be further configured to determine whether to transmit the switching command based on the GPS signal.

The system may further comprise a gyroscope operable to generate an orientation signal and being communicatively coupled to the master controller and/or at least one of the one or more slave controllers. The master controller may be further configured to determine whether to transmit the switching command based on the orientation signal.

The system may further comprise a clock operable to generate a clock signal and being communicatively coupled to the master controller and/or at least one of the one or more slave controllers. The master controller may be further configured to determine whether to transmit the switching command based on the clock signal.

The system may further comprise a wireless receiver operable to generate a wireless signal and being communicatively coupled to the master controller and/or at least one of the one or more slave controllers. The master controller may be further configured to determine whether to transmit the switching command based on the wireless signal.

The wireless signal may comprise one or more of: a Bluetooth signal, a WiFi signal, and an RF signal.

The system may further comprise one or more light sensors operable to generate one or more light readings and being communicatively coupled to the master controller and/or at least one of the one or more slave controllers. The master controller may be further configured to determine whether to transmit the switching command based on the one or more light readings.

The system may further comprise the one or more light sensors comprise one or more interior light sensors and one or more exterior light sensors. The master controller may be further configured to determine whether to transmit the switching command based on a comparison of at least one of the one or more interior light readings to at least one of the one or more exterior light readings.

The system may further comprise one or more relay slave controllers communicatively coupled to the master controller. The master controller may be further configured to transmit the switching command to the at one or more relay slave controllers. The one or more relay slave controllers may be configured, upon receiving the switching command, to relay the switching command to at least one of the one or more slave controllers.

The one or more relay slave controllers may comprise the at least one of the one or more slave controllers communicatively coupled to the master controller.

The one or more relay slave controllers may be further configured to relay the switching command to at least one of the one or more slave controllers after a delay, the delay being based on one or more light sensor readings obtained from one or more light sensors associated with the master controller and/or at least one of the one or more slave controllers.

The master controller may be further configured to transmit the switching command to the at least one of the one or more slave controllers after a delay, the delay being based on one or more light sensor readings obtained from one or more light sensors associated with the master controller and/or at least one of the one or more slave controllers.

The one or more relay slave controllers may be further configured to amplify the switching command prior to relaying the switching command.

At least one of the one or more slave controllers may be communicatively coupled to at least one other of the one or more slave controllers and is operable, in response to receiving a control signal, to transmit a switching command to the least one other of the one or more slave controllers.

The control signal may comprise one or more of the GPS signal, the clock signal, the orientation signal, the wireless signal, and the one or more light readings.

The master controller may be further configured to transmit a status request to the at least one of the one or more slave controllers. The at least one of the one or more slave controllers may be further operable to transmit a status update to the master controller in response to receiving the status request. The master controller may be further configured to output an error signal indicative that the at least one of the one or more of the slave controllers has failed, if the master controller does not receive the status update or if the status update is determined to not meet a predetermined condition.

The system may further comprise one or more current meters for measuring one or more currents in the networked system and being communicatively coupled to the master controller.

The master controller may be further configured to determine whether to output, based on the one or more measured currents, an error signal indicative that one or more of the slave controllers have failed.

The system may further comprise one or more light sensors operable to generate one or more light readings and being communicatively coupled to the master controller and/or at least one of the one or more slave controllers. The master controller may be further configured to determine whether to output, based on the one or more light readings, an error signal indicative that one or more of the slave controllers have failed.

The system may further comprise one or more backup slave controllers communicatively coupled to the master controller and at least one of the one or more slave controllers. The master controller may be further configured to determine whether to transmit the switching command to the one or more backup slave controllers based on the error signal.

The system may further comprise one or more light sensors associated with the one or more slave controllers and being operable to generate one or more light readings.

A first one of the one or more slave controllers may be configured to compare a light reading from a first associated light sensor with a light reading of a second associated light sensor. The first one of the one or more slave controllers may be configured to obtain, in response to the comparison, a reading from a third light sensor associated with a second one of the one or more slave controllers.

At least one of the one or more slave controllers may be configured to obtain an average light reading based on light readings from multiple light sensors in proximity to the at least one of the one or more slave controllers.

A first one of the one or more slave controllers may be configured to compare a light reading of a first light sensor associated with the first slave controller with a light reading of a second light sensor associated with a second slave controller. The first one of the one or more slave controllers may be configured to adjust the light reading of the first light sensor based on the comparison.

Each slave controller may be operable to apply a voltage across a corresponding switchable optical filter. A first one of the one or more slave controllers may be configured to compare a light reading of a first light sensor associated with the first slave controller with a light reading of a second light sensor associated with the first slave controller. The first one of the one or more slave controllers may be configured to adjust a voltage applied across the corresponding switchable optical filter in response to the comparison.

The system may further comprise one or more current meters for measuring one or more currents in the networked system and being communicatively coupled to at least one of the one or more slave controllers. Each slave controller may be operable to apply a voltage across a corresponding switchable optical filter. The at least one of the one or more slave controllers may be configured to cease applying voltage in response to at least one of the one or more currents being determined to be greater than a preset threshold.

The system may be comprised in: a residence, a train, an aircraft, a gondola, or an automotive vehicle. The switchable optical filters may be associated with one or more windows of the residence, the train, the aircraft, the gondola, or the automotive vehicle.

Associated methods of operating the systems of networked controllers, described herein, are set out in the appended claims.

Associated computer-readable media for executing these methods are set out in the appended claims.

In a further aspect of the disclosure, there is provided a system of networked controllers. The system comprises a plurality of switchable optical filters. The system further comprises a plurality of controllers each operable to cause a corresponding one of the switchable optical filters to transition from a first state to a second state. The system further comprises one or more sensors communicatively coupled with at least one of the controllers and configured to output one or more sensor readings. The controllers are communicatively coupled with each other. Each controller is configured, based on the one or more sensor readings, to determine whether to cause the corresponding switchable optical filter to transition from the first state to the second state. The switchable optical filters may be photochromic, and may be electrochromic.

Optional features relating to this further aspect of the disclosure are set out in the appended claims.

The disclosure furthermore embraces associated methods of operating the system of networked controllers, described above in connection with the further aspect of the disclosure.

The disclosure furthermore embraces associated computer-readable media for executing these methods.

BRIEF DESCRIPTION OF THE DRAWINGS

Various embodiments of the disclosure will now be described in connection with the accompanying drawings, of which.

DETAILED DESCRIPTION OF THE SPECIFIC EMBODIMENTS

The present disclosure seeks to provide improved systems of networked controllers, and methods of operating the same. While various embodiments of the disclosure are described below, the disclosure is not limited to these embodiments, and variations of these embodiments may well fall within the scope of the disclosure which is to be limited only by the appended claims.

In the present disclosure, unless the context clearly indicates otherwise:

(a) Directional terms such as "top", "bottom", "upwards", "downwards", "vertically", and "laterally" are used for the purpose of providing relative reference only, and are not intended to suggest any limitations on how any article is to be positioned during use, or to be mounted in an assembly or relative to an environment.

(b) The term "couple" and variants of it such as "coupled", "couples", and "coupling" are intended to include indirect and direct connections. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

(c) The singular forms "a", "an", and "the" are intended to include the plural forms as well.

(d) When used in conjunction with a numerical value, the words "about" and "approximately" mean within +/−10% of that numerical value, unless the context indicates otherwise.

Figure 1:
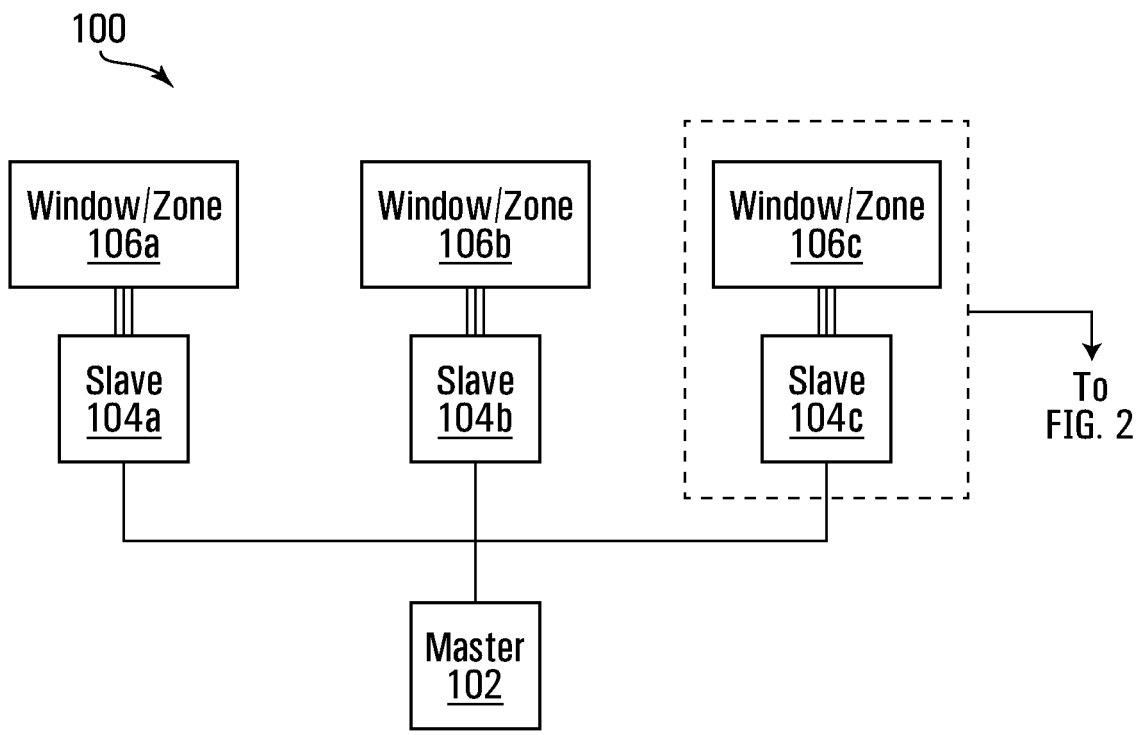
FIG. 1 is a schematic diagram of a system of networked controllers, according to an embodiment of the disclosure.

Turning to FIG. 1, there is shown an embodiment of a system 100 of networked controllers. System 100 may be comprised in an automotive vehicle, an aircraft, a train, a residence or other building, or various other environments or settings. Controllers comprise a master controller 102 communicatively coupled to a number of slave controllers 104a-c (which hereinafter may simply be referred to as "slave controllers 104"). In the present embodiment, three slave controllers 104 are shown, although in other embodiments more or fewer slave controllers may be comprised in system 100. Each slave controller 104a-c is operably connected to a corresponding switchable optical filter 106a-c (which hereinafter may be simply referred to as "optical filters 106"). Each switchable optical filter 106a-c is associated with a corresponding window. For example, with system 100 comprised within an automotive vehicle, each window of the vehicle may be associated with one of switchable optical filters 106a-c. In other embodiments, each slave controller 104a-c may be operably connected to more than a single switchable optical filter, the optical filters being associated with multiple windows which may form part of a geographic zone. For example, one of slave controllers 104a-c may be operably connected to multiple optical filters associated with the windows adjacent the driver and front passenger seats, whereas another one of slave controllers 104a-c may be operably connected to multiple optical filters associated with the windows adjacent the rear passenger seats.

In the context of the present disclosure, a switchable optical filter is an optical filter whose transmissivity to light may vary in response to particular stimuli. Specifically, switchable optical filters 106 are both photochromic and electrochromic, meaning that switchable optical filters 106 transition from a first state to a second state in response to incident light, and/or in response to a potential difference. In some embodiments, switchable optical filters 106 are configured to only transition from a first state to a second state in response to the application of a potential difference. The first state may be a state of relatively higher light transmissivity (which may be termed a "faded state"), whereas the second state may be a state of relatively lower light transmissivity (which may be termed a "dark state"). Thus, in some embodiments optical filters 106 only darken in response to the application of a potential difference. In some embodiments, a first state may comprise a first colour, and a second state may comprise a second colour. In other words, the switchable optical filters may selectively filter certain wavelengths of electromagnetic radiation.

Various examples of switchable optical filters that may be used with the systems described herein are described in US Patent Publication no. US2010/0315693, the contents of which are hereby incorporated entirely by reference.

Figure 2:
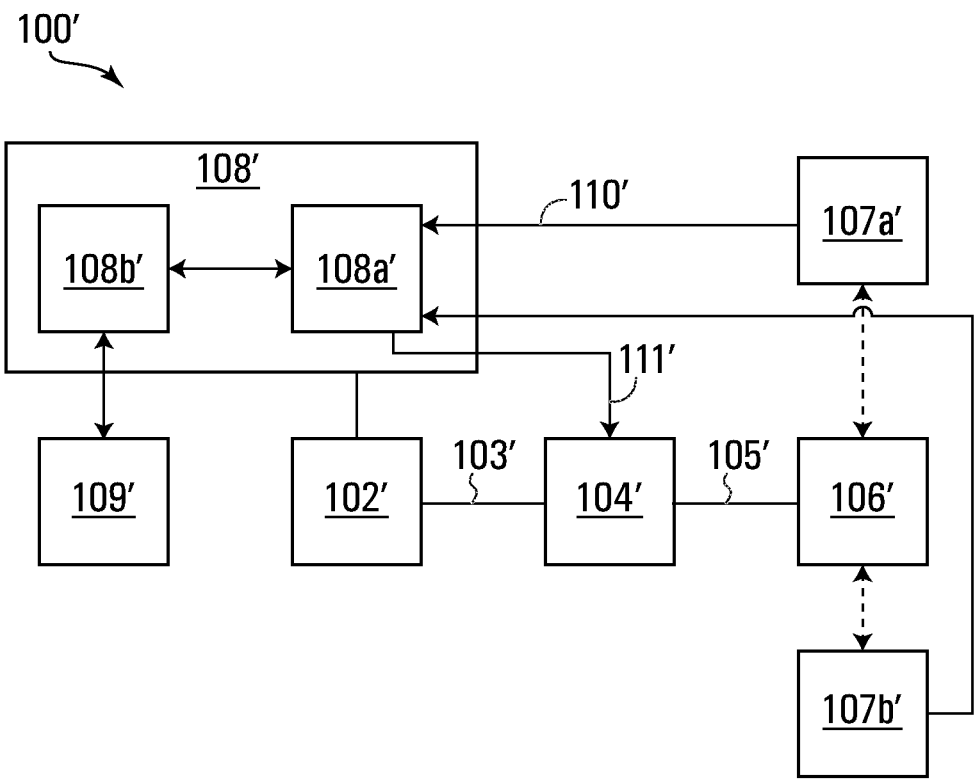
FIG. 2 is a schematic diagram of a variable transmittance window assembly.

Collectively, a slave controller 104 and its associated switchable optical filter and window form a variable transmittance window assembly 100' (now referring to FIG. 2). The window assembly 100' comprises a controller 108' (e.g. a slave controller 104) that comprises a processor 108b' and an input/output module 108a' ("I/O module") that are communicatively coupled to each other. The controller 108' is electrically coupled to a power supply 102'; a non-transitory computer readable medium 109' that has encoded on it program code that is executable by the controller 108'; switching circuitry 104' controlled by the controller 108' via a control input 111', and which is also coupled to the power supply 102' through input voltage terminals 103' and which outputs a voltage from the power supply 102' across load terminals 105'; an optical filter assembly 106' across which the load terminals 105' can apply the voltage from the power supply 102'; and an interior light sensor 107a' and an exterior light sensor 107b' (collectively, the light sensors 107a',b' are referred to as the "sensors 107"). The switching circuitry 104' may comprise, for example, an H-bridge capable of applying a forward and reverse voltage across load terminals 105', as well as open and short-circuiting the load terminals 105'. The switching circuitry is one example of voltage application circuitry that is for selectively applying different voltages across the electrodes.

The assembly 106' comprises a non-opaque substrate, such as glass used in automotive windows or polymer film; a switching material affixed to the substrate and positioned such that at least some light that passes through the substrate also passes through the switching material; and a first electrode located on one side of and electrically coupled to the switching material and a second electrode located on another side of and electrically coupled to the switching material. The transmittance of the switching material decreases until reaching a minimum on exposure to sunlight and absent application across the electrodes of a voltage required to increase the transmittance, and wherein the transmittance of the switching material increases until reaching a maximum in response to application of the voltage across the electrodes. While in the depicted example embodiment the electrodes are on opposing sides of the switching material, in different embodiments (not depicted) the electrodes may be in contact with the same side of the switching material and located on the same side of the substrate. Additionally, in different embodiments the transmittance of the switching material may change in response to different stimuli. For example, the transmittance of the switching material decreases until reaching a minimum on exposure to a first stimulus and increases until reaching a maximum in response to application of a second stimulus, wherein at least one of the first and second stimuli comprises applying a voltage across the electrodes.

A polyethylene terephthalate ("PET") film with an electrode on it is coated with the switching material. The switching material is then covered with a second PET film with the second electrode, and the switching material, PET films, and electrodes are laminated between glass using polyvinyl butyral ("PVB"). In this embodiment, the PET film on which the switching material is coated comprises the substrate. In some different embodiments, the switching material is applied directly to the glass and a single PET film is laminated over the switching material; in additional embodiments, the switching material is laminated to the PET film and neither is affixed directly to glass.

As mentioned above, the switching material incorporates hybrid photochromic/electrochromic technology. Photochromic optical filters tend to automatically darken when exposed to sunlight, and lighten in the absence of sunlight. Electrochromic optical filters, however, tend to alternate between dark and light transmissive states in response to electricity. Electrochromic optical filters, for example, tend to darken when a voltage is applied across a pair of terminals electrically coupled to different sides of the electrochromic material, and tend to lighten when the polarity of the voltage is reversed. While in the depicted embodiment the photochromic filters are tuned to darken when exposed to sunlight, in different embodiments the photochromic filters may comprise different chromophores tuned to respond to different wavelengths. For example, some chromophores may be tuned to darken in response to non-visible light, or to only a subset of wavelengths that comprise sunlight.

The optical filter assemblies 106' used in the embodiments discussed herein are based on a hybrid photochromic/electrochromic technology, which conversely darken in response to sunlight, ultraviolet, or certain other wavelengths of electromagnetic radiation (hereinafter "light") and lighten or become transparent (hereinafter interchangeably referred to as "fading") in response to a non-zero voltage applied across the terminals of the optical filter assembly. Hybrid photochromic/electrochromic optical filters comprise a switching material having one or more chromophores that are reversibly convertible between colored (dark) and uncolored (faded) states; the switching material may further comprise a solvent portion, polymers, salts, or other components to support the conversion of the chromophore between colored and uncolored states when exposed to light or voltage. Some examples of chromophores comprise fulgides, diarylethenes or dithienylcyclopentenes. However, in different embodiments (not depicted), other types of optical filters comprising alternative switching materials with similar behavior to hybrid photochromic/electrochromic switching materials, may also be employed.

While the present disclosure references operative states of the assembly 106' as simply "dark", "faded", or "intermediate", the optical transmittance or clarity of the assembly 106' in particular states may also vary according to specific embodiments. For example, the "dark" state in one embodiment may refer to a transmittance of approximately 5%, whereas in another embodiment the "dark" state may refer to transmittance anywhere in the range of 0% to approximately 15%. In another example, the assembly 106' may be optically clear when in the "faded" state in one embodiment and only partially transparent in another embodiment.

The window assembly 100' of FIG. 2 is operable to apply a portion of the supply voltage received at the input voltage terminals 103' across the load terminals 105' to transition the assembly 106' to a faded state, and is also capable of transitioning the assembly 106' to a dark state by open or short circuiting the load terminals 105', based on feedback received from the sensors 107'. As described in more detail below, the sensors 107' output a signal 110' indicative of one or both of cumulative light intensity and intensity at each of one or more wavelengths of light, and send the signal 110' to the I/O module 108a' of the controller 108'.

The processor 108b', through the I/O module 108a', receives and processes the signal 110' and controls the switching circuitry 104' via the control input 111' to place the assembly 106' into a desired state.

If the processor 108b' determines that the assembly 106' should be in the faded state, the processor 108b', via the I/O module 108a', configures the switching circuitry 104' such that at least a portion of the voltage received from the input voltage terminals 103', sufficient to transition the filter to the faded state (a "threshold voltage"), is applied across its load terminals 105' to thereby fade the assembly 106'. The magnitude of the threshold voltage to fade or transition the assembly 106' varies according to the particular switching material used, and may also be affected by extrinsic factors. In a particular embodiment, the threshold voltage is in the range of 0.6 to 2.5 V, but may also range from 0.1 to 10 V in other embodiments.

Returning to FIG. 1, master controller 102 is configured to transmit a switching command to slave controllers 104a-c. For example, in response to a user input received at master controller 102, a switching command is generated and transmitted to each slave controller 104a-c communicatively coupled to master controller 102. Each slave controller 104a-c is operable, in response to receiving the switching command, to cause the corresponding switchable optical filter 106a-c to transition from the first state to the second state.

In some embodiments, a user may wish to only cause a subset of optical filters 106a-c to undergo switching (for example only optical filters 106a and 106b). In such a case, appropriate user input provided to master controller 102 will result in the switching command comprising an indication of the subset of slave controllers 104a-c to which the switching command is to be transmitted. The master controller 102 is then further configured to transmit the switching command to each slave controller 104a and 104b of the subset.

In embodiments, master controller 102 may be mounted in the center console of the vehicle. A slave controller 104 may be associated with a sunroof. The same configuration may be expanded to include the side and rear windows of the vehicle, and the shade band on the windshield as well. In this case when activated the master controller 102 sends a switching command to each slave controller 104 individually to turn on or off, or change tint. One benefit of the system described herein is that each slave controller 104 is in parallel with each other such that, if any one slave controller 104 fails, the switching command is still sent to the other slave controllers 104. Another benefit is that the master controller 102 can be located anywhere within the vehicle rather than being required to be near the window that is to be controlled. Furthermore, the slave controller 104 doesn't need to be user accessible, such as in the case where it is mounted within the headliner or incorporated into the laminated glass stack. Another benefit is that the master controller 102 can send a different signal to each slave controller 104 based on user preference. For instance, particular slave controllers 104 associated with particular zones can be faded, and not others. Alternatively, themes could be created such as all windows except the sunroof are to be darkened. In another theme all the side windows are darkened and the sunroof faded. In another theme the rear window is faded and all other windows are darkened. In another theme all windows are darkened to 50% transmissivity, wherein 50% transmissivity is an amount of transmissivity halfway between a minimum transmissivity affordable by the optical filter and a maximum transmissivity affordable by the optical filter. In another theme, slave controllers 104 could try to maintain uniform light within the vehicle interior such that if light is shining from the left then the left-facing windows are darkened and the right-facing windows are lightened. All of these different switching commands could be issued from master controller 102 based on user preference.

Master controller 102 could be incorporated into existing electronics or be a standalone module. Master controller 102 does not need to be the same as slave controllers 104. Master controller 102 could be a touch panel or touchpad, a hand-held remote control, a phone app, a computer program, an automated system such as a home automation system or a vehicle ECU, a wall-mounted switch, or any other number of suitable devices.

In the embodiment of FIG. 1, master controller 102 and slave controllers 104a-c are configured to communicate over two-way communication lines. Thus, data (for example switching commands) may be transmitted from master controller 102 to slave controllers 104a-c, and data (for example temperature sensor readings, and/or light sensor readings obtained from a temperature sensor and light sensors may be transmitted from slave controllers 104a-c to master controller 102 and/or other ones of slave controllers 104a-c.

Figure 3:
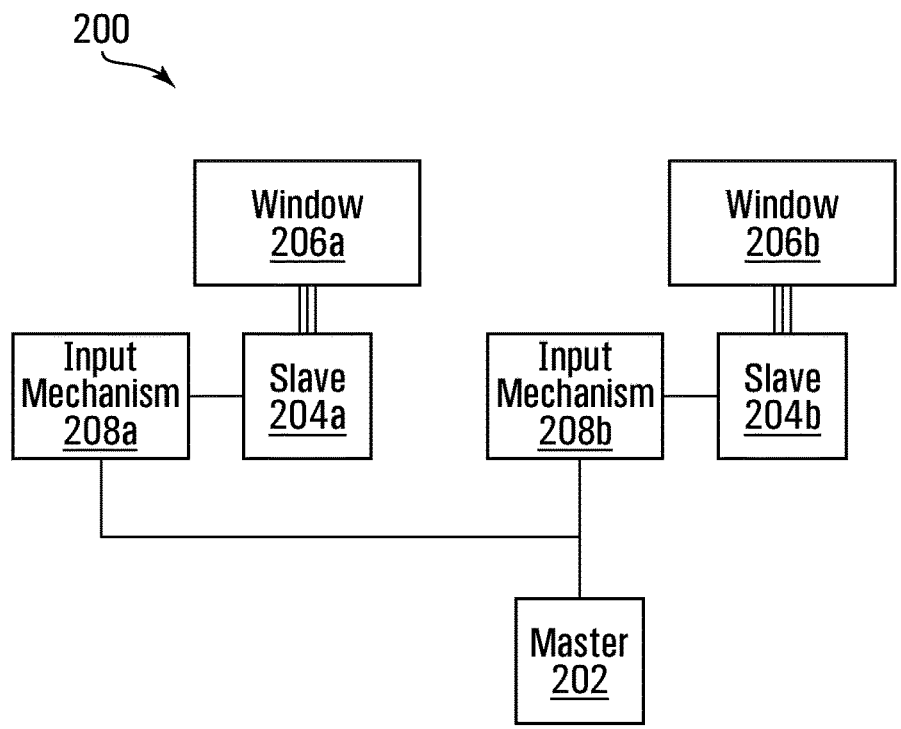
FIG. 3 is a schematic diagram of a system of networked controllers, according to an embodiment of the disclosure.

Turning to FIG. 3, there is shown another embodiment of a system 200 of networked controllers. In this embodiment, master controller 202 is communicatively coupled to slave controllers 204a and 204b via input mechanisms 208a and 208b. Each slave controller 204a and 204b is operably associated with a corresponding input mechanism 208a and 208b (for example a toggle switch). User input received at an input mechanism 208a,b causes a switching command to be generated at slave controller 204a,b and results in the corresponding optical filter 206a,b transitioning from a first state to a second state. In this embodiment, master controller 202 may be configured to override any user input received at input mechanisms 208a,b. In other words, if a (master) switching command is generated at master controller 202 and transmitted to slave controllers 204a,b, and if (slave) switching commands are generated at slave controllers 204a,b in response to user input received at input mechanisms 208a,b, the (master) switching command will take precedence over the (slave) switching commands.

As can be seen from the embodiment of FIG. 3, in certain circumstances it might be beneficial to have a slave controller user-accessible for certain windows. For instance, the right rear passenger might want their window faded while the left rear passenger might want their window dark. If the master controller has not issued a switching command then local controls received at the slave controllers can control their windows. However, if the driver decides they want all windows dark, for example to make the driving safer, then then they may override the individual slave switching commands. A priority could be implemented in this case to dictate when local user control is prioritized over the master signal, and when the master signal overrides local control. This could be based on a delay time between the various signals and, for instance, an amount of time a button is pressed. For instance, if a master button (associated with the master controller) is held for more than 3 seconds then its command may be configured to override local control. However, if the master button is pressed for fewer than 3 seconds then after 5 minutes local control is automatically re-enabled. The durations of these delays are merely exemplary. Alternatively, a window may respond to the most recent command, regardless of whether it came from the master controller or a local controller. The system may further comprise a lock switch that permanently disables local control.

Figure 4:
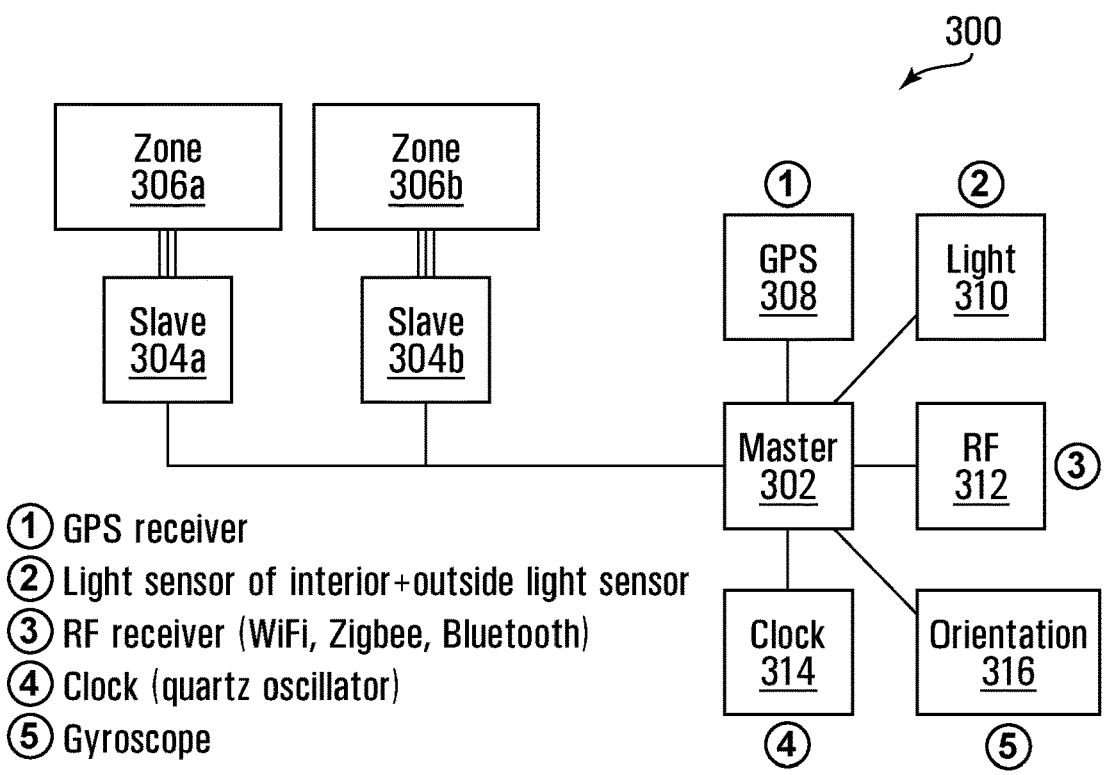
FIG. 4 is a schematic diagram of a system of networked controllers with a master controller communicatively coupled to various signal generators, according to an embodiment of the disclosure.

Turning to FIG. 4, there is shown another embodiment of a system 300 of networked controllers. In system 300, master controller 302 is communicatively coupled to a GPS receiver 308, one or more light sensors 310, an RF receiver 312, a clock 314, and a gyroscope 316. GPS receiver 308 is operable to generate a GPS signal. Master controller 302 is further configured to determine whether to transmit the switching command based on the GPS signal. For example, for a given range of GPS signals, master controller 302 may be configured to generate and transmit a switching command to slave controllers 304a,b.

Gyroscope 316 is operable to generate an orientation signal. Master controller 302 is further configured to determine whether to transmit the switching command based on the orientation signal. For example, for a given range of orientation signals, master controller 302 may be configured to generate and transmit a switching command to slave controllers 304a,b.

Clock 314 is operable to generate a clock signal. Master controller 302 is further configured to determine whether to transmit the switching command based on the clock signal. For example, for a given range of clock signals (e.g. according a preset schedule), master controller 302 may be configured to generate and transmit a switching command to slave controllers 304a,b.

RF receiver 312 is operable to generate an RF signal. Master controller 302 is further configured to determine whether to generate and transmit a switching command based on the RF signal. For example, for a given range of RF signals, master controller 302 may be configured to generate and transmit a switching command to slave controllers 304a,b.

Light sensor(s) are operable to generate light readings. Master controller 302 is further configured to determine whether to transmit a switching command based on the light readings. For example, for a given range of light readings, master controller 302 may be configured to generate and transmit a switching command to slave controllers 304a,b.

The light sensors may comprise one or more interior light sensor and one or more exterior light sensor. The master controller may be further configured to transmit the switching command based on a comparison of the interior light readings to the exterior light readings.

Thus, using system 300, master controller 302 may automatically issue switching commands based on for example time of day or GPS position. For instance, if a vehicle is driving toward a tunnel, the windows may all lighten just prior to entering the tunnel based on GPS location. The windows may then be darkened immediately after exiting the tunnel to provide the best visibility for the driver. Alternatively, if a vehicle is driving west, the sun is on the driver's side, the windows of the driver's side are dark and the windows on the passenger side are faded, the windows on the driver's side could automatically lighten, and those on the passenger side could darken, in response to the driver turning around and driving east. Alternatively, if the driver starts driving north then only the rear window can remain dark and all other windows may lighten in order to block the sun's glare while providing outward visibility. As another example, the windows could automatically lighten when a user approaches their final destination based on the GPS signal. The windows in a car could automatically lighten in response to changes in visibility (e.g. as dusk approaches). Alternatively, if the windows are faded and sunrise occurs, the windows may automatically be allowed to darken as the user is driving. Furthermore, window control might be incorporated into the vehicle ECU such that, when a keyfob is pressed or when the user approaches their vehicle, the windows automatically fade.

If system 300 is incorporated in a residence, based on the time of day determined from the clock signal, the windows in a house may automatically darken when the house's occupant typically heads to bed and wants to block light. In a house there might be a central automation system that controls heating, cooling and lighting. This system may additionally incorporate smart window control such that, based on a preset schedule, the windows automatically change transmissivity. If the windows are colour-changing rather than purely darkening and fading windows, it may be beneficial to have the windows switch to a certain color based on a mood selection by the user, for a particular room or time of day.

As another example, if a user cooks at roughly the same time every day and the sun sets at that time, the user could have a particular window darken as the sun moves such that they never receive direct glare from the sun. All other windows may be faded to provide good ambient light. This adaptive sun-blocking feature could be further extended in a fully connected home such that, as the user moves around their kitchen and living room, the automated system knows the angle and trajectory of the light and darkens specific windows resulting in the user never receiving direct sunlight as they move around their home.

The skilled person would appreciate that these are merely examples of how a master controller may be programmed to issue switching commands in response to various signals received at the master controller. The scope of the present disclosure embraces many other various ways of configuring the master controller.

Figure 5:
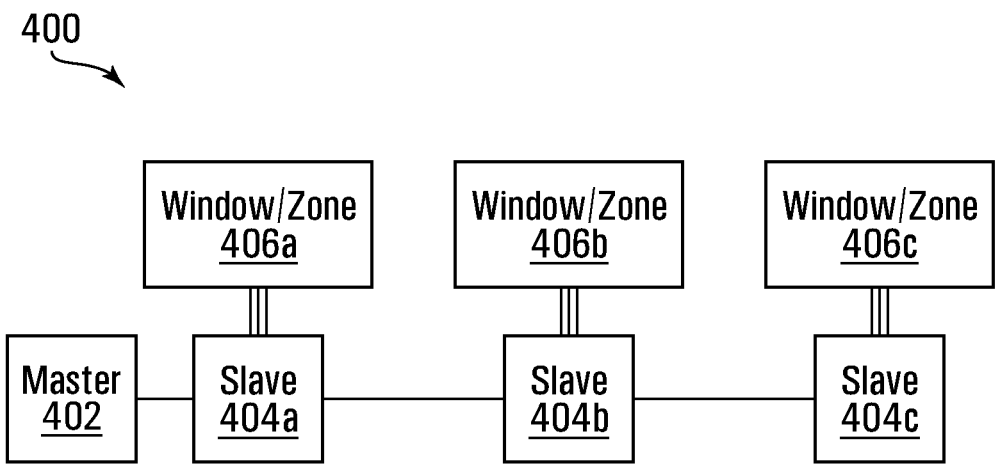
FIG. 5 is a schematic diagram of a system of networked controllers with slave controllers acting as relays, according to an embodiment of the disclosure.

Turning to FIG. 5, there is shown another embodiment of a system 400 of networked controllers. In this embodiment, master controller 402 is communicatively coupled to a first slave controller 404a. First slave controller 404a acts as a relay and passes on a switching command received from master controller 402 to a second slave controller 404b, connected in series to first slave controller 404a. Second slave controller 404b acts as a relay and passes on the switching command to a third slave controller 404c connected in series to second slave controller 404a. As would be understood by the skilled person, such a setup may be extended to include any number of slave controllers, with each slave controller passing the switching command to the next slave controller. Slave controllers 404a-c may be configured to amplify the switching command prior to relaying the switching command to the subsequent serially-connected slave controller.

In comparison to a master controller communicatively coupled to multiple slave controllers, a relay implementation such as shown in FIG. 5 may reduce the amount of cabling and signals sent over the communication bus. This may reduce the cost of the overall system, and/or may allow for faster response as a result of less traffic over the communication bus. The relay implementation may be useful with rows or arrays of windows when the distance between windows is large, since each slave controller may boost the signal before it is relayed to the next controller. Furthermore, the master-to-slave relay implementation may result in unique window fading patterns that might be beneficial in some situations. For example, with many windows in a row, the first window may fade and, once faded, the associated slave controller may relay the message to the subsequent slave controller for fading, and so on, resulting in a scrolling effect.

In the above embodiments, the term "master" is generally used to refer to a control that transmits a switching command to other controllers, and the term "slave" is generally used to refer to a controller which receives a switching command. In other embodiments (not depicted), a slave controller may itself generate its own switching command, thereby effectively acting as a master controller. This may be especially true in the case of a slave controller that controls another network of controllers. For example, a master controller may send a switching command to a slave controller, and the slave controller may manipulate the switching command send another switching command to another next slave controller, thus becoming a master controller in the process.

For instance, consider the case of a train with multiple carriages, each carriage comprising multiple windows, each window associated with a corresponding slave controller and switchable optical filter. Each carriage may also comprise a dedicated slave controller. The master controller may send a switching command to all dedicated slave controllers to fade all the windows in the train. Each dedicated slave controller, after receiving the switching command, may become a master controller and send a switching command to each of the individual slave controllers in the carriages connected to the dedicated slave controller.

Another example of a slave controller becoming a master controller is in the case of an architectural building incorporating a system of networked controllers, as described herein. A master controller may send a switching command to darken windows that have direct light shining on them. The slave controllers associated with windows that have direct incident light will turn dark, and all other windows in the shade will fade. Rather than having all slave controllers continuously monitor the transmitted and inbound light, those windows that are faded may remain faded until a switching command is received from another slave controller. For example, after some time has elapsed the sunlight may have moved closer to another side of the building. In this case the slave controller that currently controls the dark windows on the originally sunlit side may, in response to changing sunlight, become a master controller and instruct the slave controllers on the other side of the building to start darkening their associated windows.

There may also be multiple levels of master controllers and slave controllers. For example, in a large building each office may have a master controller connected to slave controllers at each window. The office-level master controllers may then be further connected to a floor-level master controller that controls the entire floor, for example. In turn, each floor-level master controller may be connected to yet another building-level master controller that controls the entire building. Thus, controllers can be arranged in a multi-layer hierarchical setup, with rules setup for which hierarchy of controllers takes priority for specific situations.

It is possible for a controller or parts of a controller to fail during its lifetime. This may pose problems in a relay implementation since a switching command or other message will not be relayed to the next slave controller. Depending on the communication protocol that is being used, it is possible to implement checks to see if a slave controller is functioning as intended. With certain protocols that can provide feedback such as CAN, I2C, LIN, Bluetooth, and WiFi, the master controller may request a response from a particular slave controller. If the slave controller does not reply, the master controller may be alerted to the fact that the slave controller is no longer functioning as intended, and may output an appropriate error indication (for example on a user interface). With other protocols such as RF and straight wire implementations, it is be possible to monitor the current drawn on the system when a controller is supposed to turn on. A depiction of such a system is provided below in FIG. 6.

Figure 6:
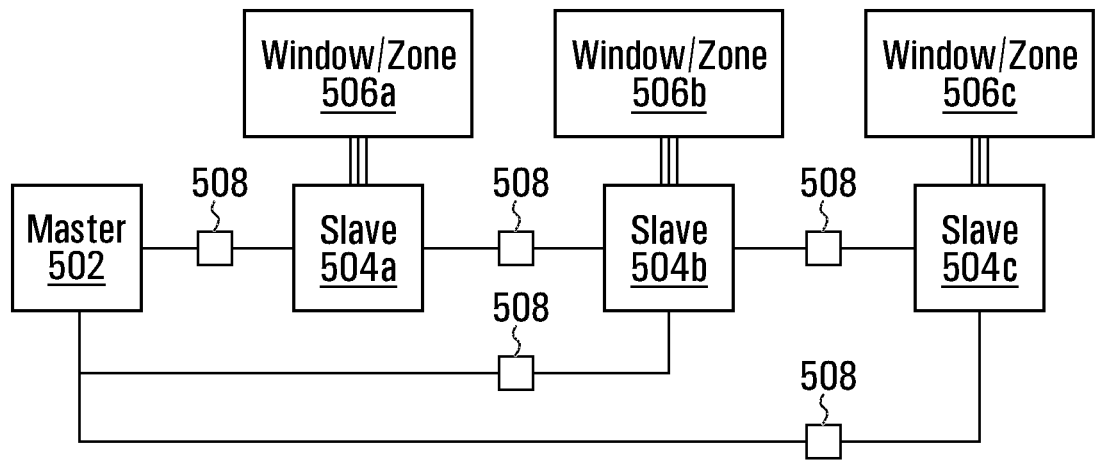
FIG. 6 is a schematic diagram of a system of networked controllers including current sensors, according to an embodiment of the disclosure.

Turning to FIG. 6, where is shown a further embodiment of a system 500 of networked controllers. As before, master controller 502 is communicatively coupled to slave controllers 504a-c. Each slave controller 504a-c is operably coupled to a switchable optical filter 506a-c associated with a window. A number of current sensors 508 are provided in the network to measure the amount of current drawn by each of slave controllers 504a-c. Current sensors 508 measure one or more currents in the networked system 500 and are communicatively coupled to master controller 502. Master controller 502 is further configured to output, based on the one or more measured currents, an error signal indicative that one or more of the slave controllers have failed.

For example, if a measured current is unusually low or high, this may be indicative of a failure of a slave controller 504. If a slave controller is requested to apply power to a window and the current doesn't change, then the slave controller may have failed. Until repaired, master controller 502 may send the switching command to another backup slave controller (not depicted), if there are redundant slaves controllers in the system. Alternatively, if several slave controllers are daisy-chained using for example an I2C, CAN or LIN protocol, then the master controller may be communicatively coupled to each slave controller, and if a particular slave controller fails then only that node is taken out of commission and the signal propagation does not require that a particular slave controller become a master and relay the message. This could be suitable for applications that only have a short wire run length and signal loss is not a factor. This could also be done using a different network configuration wherein there is at least one redundant path for any messages to travel from the master controller to any given slave controller, such that alternative routes could be taken if one node is out of commission.

In other embodiments (not depicted), each slave controller may be operably connected to one or more light sensors. The light sensors may comprise both exterior light sensors (configured to measure an amount of light incident on the optical filter) and interior light sensors (configured to measure an amount of light transmitted through the optical filter). It is possible that one of the light sensors may fail or becomes covered by dirt, leaves, water, or bird droppings for example. For an inside sensor, or transmitted light sensor, this may be accounted for by having a second redundant light sensor. However, for an external sensor, or inbound light sensor, alternative data transfer can take place to mitigate this problem.

For example, if the slave controller determines its sensor to be blocked, due to the inside light reading being higher than the outside light reading, the slave controller may request the outside light reading of an adjacent or nearby window. It may then use the external sensor reading from the adjacent/nearby window to determine the current fade state of the window. This may suffice for controlling the window well enough for the particular application. In order to better control the window, it may also be beneficial to have each slave controller communicate with nearby slave controllers to obtain their internal and external light readings. Thus, a slave controller may use the average outside light reading, based on multiple windows rather than just one, to better control window transmission. Alternatively, if all three windows are requested to fade at the same time, a slave controller can compare its fade state and color with those of nearby windows to determine if there potentially is a problem. If for example the middle window has a darker reading than the two outside windows, it may be because of a short circuit preventing the window fading, or insufficient voltage being applied, or other problems with the voltage regulator. By monitoring the current applied, the window can diagnose what may be going on and may try to counteract the problem. In the case of the current being low and the reading being lower, the slave controller may boost the voltage until the current matches those of the nearby windows to determine if the window correctly fades after making this change. If the controllers compare current readings, it is possible a controller could determine a pre-eminent window failure in the case of dramatically increased current when compared to nearby windows for the same applied voltage.

In the case of a window failing, it is possible to use the methods described herein to determine the window failure and similarly cease applying voltage to it. For instance, by monitoring current, one might determine that the current is extremely high for a given voltage (in the case of a short circuit) or that the current is zero (in the case of damage to the bus bar or a severed conductive electrode). In the case of high current it may be advantageous to cease applying voltage to the window to not drag the voltage rail low, to save power, and to prevent shorting the voltage to another component in the vehicle or building, in the case that a conductive surface of the window touches a conductive surface within the vehicle or building. It should also prevent components from overheating and causing a fire or further damage to the controller as a result of a window failure. In the case of no current, the controller should cease applying voltage to that window in order to save power or prevent voltage spikes and subsequent electrical noise if it is an intermittent connection. Another way to determine a window failure is to monitor the fade state. In the case of a short circuit or open circuit, it is possible the lightened state will not change when voltage is applied to the window. This could be used if a current sensor is not implemented in a particular controller.

Networked controllers controlling switchable optical filters as described herein could be used in almost any application including automobiles, aircraft, trains, architectural settings, home or building security, home automation, ski lifts or gondolas, etc. As the skilled person will recognise, this list is not exhaustive.

For planes and trains, it may be beneficial to send a switching command to each window to fade or darken during take-off or landing or if a crash occurs. It might be beneficial in this case to send a signal to the first window in a row and, for the associated controller to relay the message to the next controller. This would propagate throughout the cabin. However, a local override may also be implemented so that each window could have a dedicated controller such that a user may indicate how they would like the window to be tinted during times in which the master has not indicated an override. Alternatively, each user could have a simple button whose signal is fed into or reported back to the master controller, and the master controller then signals the slave controller to lighten (rather than the user interacting directly with the slave controller).

In the architectural market, a signal could be sent to certain sides of a house or may control upper or lower windows in a double-vaulted ceiling. Additionally, a pattern could be shown using several windows connected to a master controller, and that master controller could randomly change the pattern during the day. All windows could automatically go dark when a person leaves the house for safety reasons, or to save on air conditioning energy use during the summer. Alternatively, they could automatically fade during the winter when the sun is shining to allow heat to enter the house. They could be connected to the light switch such that, when a person enters a room and turns on the light switch during dusk or dawn, the windows fade. Alternatively, the windows may automatically be allowed to darken when the light switch is turned on, for privacy, such that it would be harder for people to see into the house during the night.

For a ski lift or gondola, it may be beneficial for one gondola to pre-emptively signal another gondola to fade or darken based on the amount of light hitting its windows, such as in the case of a gondola cresting a hill. If the gondola cresting the hill is directly in the sunlight and the windows take more than 30 seconds (for example) to darken, it may be beneficial for the first gondola to send a signal to the second gondola to start darkening the windows so that when it crests the hill the windows will already be dark. Since this may only happen at certain times of day, the gondolas may have to do this automatically rather than have a preset schedule or a master controller controlling the individual gondolas. It may also be beneficial to have all the windows automatically fade when a gondola arrives at the top of the mountain and people are disembarking.

Depending on the application, it may be advantageous to network the controllers using different communication protocols. For instance, in vehicles the communication protocol may use the existing CAN or LIN bus. The CAN bus is more fault tolerant and likely more expensive to implement due to its requirement for more wire, higher speeds and more advanced protocols. The LIN bus could also be successfully used in a vehicle as the fading of a window or controller is not safety critical such as ABS or steering. On the LIN and CAN buses, if a controller fails, only that node will be taken out of commission and all other nodes on the LIN wire would continue to operate as normal. WiFi, Bluetooth, RF or other wireless communications protocols could be also used in a vehicle for networking the controllers.

For the architectural market, it is possible to use all of the protocols listed above, and in particular Ethernet or other existing home automation protocols that user power lines for communication such as Universal powerline bus, X10 or LonTalk. These protocols would allow windows to be connected together without running new wire. The installer would connect the standard 120V or 220V into the slave and master controllers that would subsequently reduce the voltage to low-voltage DC power for use with the controllers. Communication would occur by high-frequency signals being superimposed over the standard AC power signal.

For other implementations where no standard communication standards exist, it may be advantageous to use other protocols not yet listed, such as UART or I2C protocols, to communicate between master and slave controllers.

Figure 7:
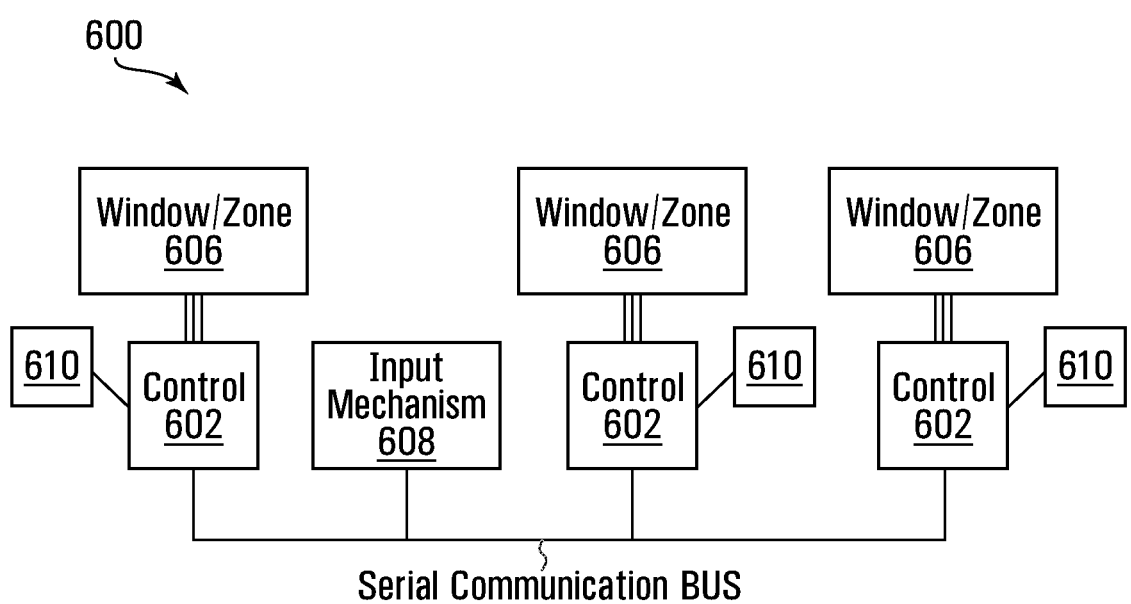
FIG. 7 is a schematic diagram of a system of networked controllers, according to an embodiment of the disclosure.

While the above embodiments show a master controller communicatively coupled to multiple slave controllers, the term "master" is largely used to denote the particular controller that is transmitting the switching command to one or more other controllers. Similarly, the term "slave" is largely used to denote the particular controller or controllers that are receiving the switching command. In other embodiments, the labels "master" and "slave" do not apply, for example as shown in FIG. 7. In this embodiment, there is shown a system 600 of networked controllers 602 communicatively coupled to one another. Each controller 602 is communicatively coupled to input mechanism 608. As described in connection with other Figures, each controller 602 is operably coupled to a switchable optical filter 606 (incorporated for example in a window of an automotive vehicle, an aircraft, or a train). System 600 also includes a number of sensors 610 communicatively coupled to controllers 602.

In some embodiments it may be beneficial to not have any designated "master" or "slave" controllers; however, the controllers are still communicatively coupled to one another. Sensor readings from light or temperature sensors, for example, or from a user input, are communicated and shared between all controllers. In this case each controller acts independently based on the inputs of the combined sensor readings from all controllers. For instance, it is possible that only one window in a group of three has an external (inbound) light sensor connected to it to save on cost, weight or complexity. This external sensor reading may be shared between three controllers each connected to separate windows, and these controllers may use this external sensor reading along with their own internal (transmitted) light sensor reading to adjust the transmission of only the windows they are connected to, without any master controller being present. Each controller may decide to fade the window either automatically or manually. Another example would be if a user presses a button to fade a particular window. This button push might be shared with other connected controllers. In the case that other windows in a group determine they are already fully faded, they might do nothing. In another case, if the controllers are networked to each other and also the vehicle ECU, and the controllers determine the temperature of the vehicle is increasing rapidly, they might independently decide to automatically turn off to allow the windows to darken to reduce the inbound light and hopefully slow the vehicle internal cabin temperature increase.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A system of networked controllers, comprising:
one or more switchable optical filters, wherein the switchable optical filters are photochromic and electrochromic;
a master controller; and
one or more slave controllers operably connected to the one or more switchable optical filters,
wherein:
at least one of the one or more slave controllers is communicatively coupled to the master controller;
the master controller is configured to transmit a switching command to the at least one of the one or more slave controllers; and
each slave controller is operable, in response to receiving the switching command, to cause a corresponding switchable optical filter to transition from a first state to a second state, and
further comprising one or more of the following communicatively coupled to the master controller and/or at least one of the one or more slave controllers: a GPS receiver operable to generate a GPS signal; and a gyroscope operable to generate an orientation signal, wherein the master controller is further configured to determine whether to transmit the switching command based on one or more of the GPS signal, and the orientation signal.

2. The system of claim 1, wherein the first state comprises a first colour and the second state comprises a second colour, or wherein the first state comprises a first amount of light transmittance and the second state comprises a second amount of light transmittance.

3. The system of claim 1, wherein the switchable optical filters are configured to transition from a first state of relatively lower light transmittance to a second state of relatively higher light transmittance in response to application of a potential difference across the switchable optical filters, or wherein the switchable optical filters are configured to transition from a first state of relatively higher light transmittance to a second state of relatively lower light transmittance in response to light incident on the switchable optical filters.

4. The system of claim 1, wherein:
the switching command comprises an indication of a subset of the one or more slave controllers; and
the master controller is further configured to transmit the switching command to each slave controller of the subset of the one or more slave controllers.

5. The system of claim 1, wherein:
the one or more slave controllers are associated with one or more geographic zones;
the indication comprises at least one of the geographic zones; and
the master controller is further configured to transmit the switching command to each slave controller associated with the at least one of the geographic zones.

6. The system of claim 1, wherein each slave controller is further operable, in response to detecting a further switching command, to cease the corresponding switchable optical filter from transitioning from the first state to the second state.

7. The system of claim 1, further comprising:
one or more light sensors operable to generate one or more light readings and being communicatively coupled to the master controller and/or at least one of the one or more slave controllers,
wherein the master controller is further configured to determine whether to transmit the switching command based on the one or more light readings.

8. The system of claim 1, further comprising:
one or more relay slave controllers communicatively coupled to the master controller,
wherein:
the master controller is further configured to transmit the switching command to the at one or more relay slave controllers; and
the one or more relay slave controllers are configured, upon receiving the switching command, to relay the switching command to at least one of the one or more slave controllers.

9. The system of claim 1, wherein the master controller is further configured to transmit the switching command to the at least one of the one or more slave controllers after a delay, the delay being based on one or more light sensor readings obtained from one or more light sensors associated with the master controller and/or at least one of the one or more slave controllers.

10. The system of claim 1, further comprising:
one or more current meters for measuring one or more currents in the networked system and being communicatively coupled to the master controller,
wherein the master controller is further configured to determine whether to output, based on the one or more measured currents, an error signal indicative that one or more of the slave controllers have failed.

11. The system of claim 1, wherein:
the system is comprised in: a residence, a train, an aircraft, a gondola, or an automotive vehicle; and
the switchable optical filters are provided in one or more windows of the residence, the train, the aircraft, the gondola, or the automotive vehicle.

12. A system of networked controllers, comprising:
one or more switchable optical filters, wherein the switchable optical filters are photochromic and electrochromic;
a master controller; and
one or more slave controllers operably connected to the one or more switchable optical filters,
wherein:
at least one of the one or more slave controllers is communicatively coupled to the master controller;
the master controller is configured to transmit a switching command to the at least one of the one or more slave controllers; and
each slave controller is operable, in response to receiving the switching command, to cause a corresponding switchable optical filter to transition from a first state to a second state, and
wherein:

at least one of the one or more slave controllers is communicatively coupled to at least one other of the one or more slave controllers and is operable, in response to receiving a control signal, to transmit a switching command to the least one other of the one or more slave controllers.

13. A system of networked controllers, comprising:
one or more switchable optical filters, wherein the switchable optical filters are photochromic and electrochromic;
a master controller; and
one or more slave controllers operably connected to the one or more switchable optical filters,
wherein:
at least one of the one or more slave controllers is communicatively coupled to the master controller;
the master controller is configured to transmit a switching command to the at least one of the one or more slave controllers; and
each slave controller is operable, in response to receiving the switching command, to cause a corresponding switchable optical filter to transition from a first state to a second state, and, wherein:
the master controller is further configured to transmit a status request to the at least one of the one or more slave controllers;
the at least one of the one or more slave controllers is further operable to transmit a status update to the master controller in response to receiving the status request; and
the master controller is further configured to output an error signal indicative that the at least one of the one or more of the slave controllers has failed, if the master controller does not receive the status update or if the status update is determined to not meet a predetermined condition.

14. A system of networked controllers, comprising:
one or more switchable optical filters, wherein the switchable optical filters are photochromic and electrochromic;
a master controller; and
one or more slave controllers operably connected to the one or more switchable optical filters,
wherein:
at least one of the one or more slave controllers is communicatively coupled to the master controller;
the master controller is configured to transmit a switching command to the at least one of the one or more slave controllers; and
each slave controller is operable, in response to receiving the switching command, to cause a corresponding switchable optical filter to transition from a first state to a second state, and further comprising:
one or more light sensors operable to generate one or more light readings and being communicatively coupled to the master controller and/or at least one of the one or more slave controllers,
wherein the master controller is further configured to determine whether to output, based on the one or more light readings, an error signal indicative that one or more of the slave controllers have failed.

15. A system of networked controllers, comprising:
one or more switchable optical filters, wherein the switchable optical filters are photochromic and electrochromic;
a master controller; and
one or more slave controllers operably connected to the one or more switchable optical filters,
wherein:
at least one of the one or more slave controllers is communicatively coupled to the master controller;
the master controller is configured to transmit a switching command to the at least one of the one or more slave controllers; and
each slave controller is operable, in response to receiving the switching command, to cause a corresponding switchable optical filter to transition from a first state to a second state, and further comprising:
one or more backup slave controllers communicatively coupled to the master controller and at least one of the one or more slave controllers,
wherein the master controller is further configured to determine whether to transmit the switching command to the one or more backup slave controllers based on an error signal.

16. A system of networked controllers, comprising:
one or more switchable optical filters, wherein the switchable optical filters are photochromic and electrochromic;
a master controller; and
one or more slave controllers operably connected to the one or more switchable optical filters,
wherein:
at least one of the one or more slave controllers is communicatively coupled to the master controller;
the master controller is configured to transmit a switching command to the at least one of the one or more slave controllers; and
each slave controller is operable, in response to receiving the switching command, to cause a corresponding switchable optical filter to transition from a first state to a second state, and
further comprising one or more light sensors associated with the one or more slave controllers and being operable to generate one or more light readings, wherein a first one of the one or more slave controllers is configured to:
compare a light reading of a first light sensor associated with the first slave controller with a light reading of a second light sensor associated with a second slave controller; and
adjust the light reading of the first light sensor based on the comparison, and
at least one of the one or more slave controllers is configured to cease applying voltage in response to at least one of the one or more currents being determined to be greater than a preset threshold.

* * * * *